Oct. 1, 1940. G. B. GALLASCH ET AL Re. 21,587
MICROSCOPE
Original Filed Dec. 7, 1935
FIG. 1
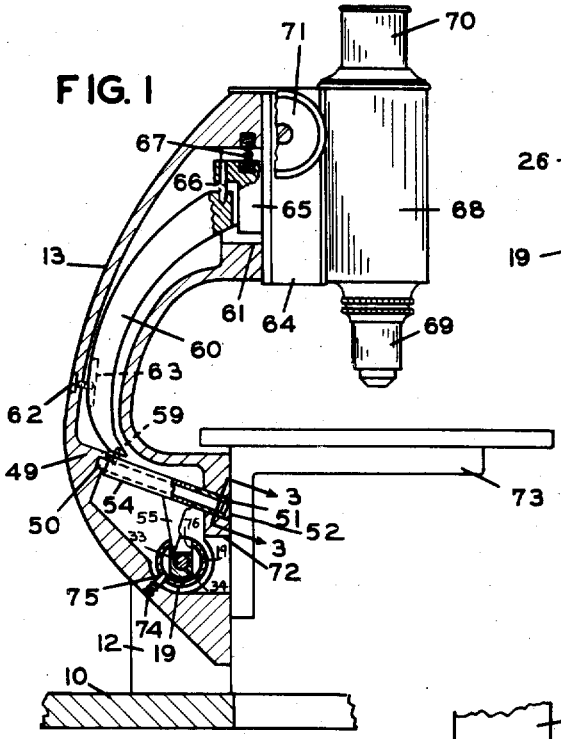
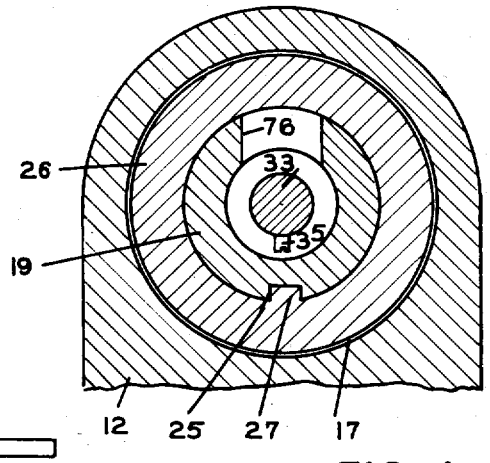
FIG. 4
FIG. 3
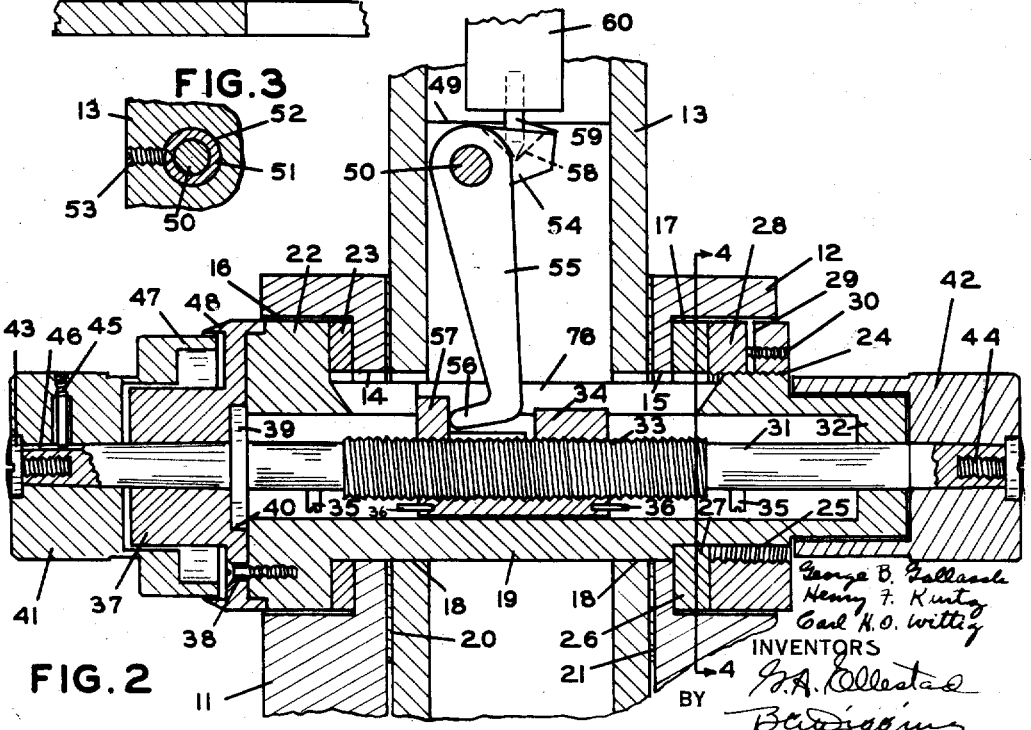
FIG. 2
George B. Gallasch
Henry F. Kurtz
Carl H. O. Witting
INVENTORS
BY G. A. Ellestad
B. C. Higgins
ATTORNEYS Reissued Oct. 1, 1940

Re. 21,587

UNITED STATES PATENT OFFICE 21,587

MICROSCOPE

George B. Gallasch and Henry F. Kurtz, Rochester, and Carl H. O. Wittig, Irondequoit, N. Y., assignors to Bausch & Lomb Optical Company, Rochester, N. Y., a corporation of New York Original No. 2,208,839, dated July 23, 1940, Serial No. 244,438, December 7, 1935. Application for reissue August 7, 1940, Serial No. 351,760

3 Claims. (Cl. 88—39)

The present invention relates to microscopes and more particularly to mechanisms for obtaining fine adjustments of focus.

One of the objects of the present invention is to provide a new and improved fine adjustment for microscopes. Another object is to provide a microscope in which the operating knob for the fine adjustment is located adjacent the base. A further object is to provide a microscope having a low position fine adjustment without weakening the microscope arm. These and other objects and advantages reside in certain novel features of construction, arrangement and combination of parts as will hereinafter be more fully set forth and pointed out in the appended claims.

Referring to the drawing:

Fig. 1 is a vertical section with parts in elevation, showing our new microscope.

Fig. 2 is an enlarged fragmentary vertical section of the fine adjustment actuating mechanism.

Fig. 3 is a section taken on line 3—3 of Fig. 1.

Fig. 4 is a section taken on line 4—4 of Fig. 2.

One embodiment of our invention is illustrated in the drawing wherein 10 designates a base having two upstanding projections 11 and 12 spaced apart to receive the microscope arm 13. These projections 11 and 12 are formed with aligned bearing apertures 14 and 15, respectively. A recess 16 is formed in the projection 11 around the aperture 14 and a similar recess 17 is formed in the projection 12 around the aperture 15. The microscope arm 13 is hollow and has aligned openings 18 in its side walls in alignment with the openings 14 and 15 of the projections 11 and 12.

A hollow cylindrical bushing 19 extends through the openings 14, 15 and 18 and forms a bearing on which the arm 13 pivots relative to the base 10. Two washers 20 and 21 are placed on this bushing 19 between the arm 13 and the projections 11 and 12.

One end of the bushing 19 is formed with an enlarged head or flange 22 which fits within the recess 16 and bears against a washer 23. The other end of the bushing 19 is threaded at 24 and is provided with a key slot 25. A washer 26 fits over the bushing 19 within the recess 17 and is held against rotation relative to the bushing by a key 27 which engages in the slot 25. A nut 28 is threaded on the portion 24 of the bushing 19 and engages the washer 26 to secure the bushing 19 in the projections 11 and 12. This nut 28 is transversely slotted at 29 and a screw 30 is threaded through one side of the slot to spread the nut 28 and lock it securely on the bushing 19.

A shaft 31 extends longitudinally through the bushing 19 and is journalled at one end in the end wall 32 thereof. The central portion of this shaft 31 is threaded as indicated at 33 and a travelling nut 34 is threaded on this portion of the shaft. A slot 76 extends longitudinally through the side wall of the bushing 19 and the walls of this slot engage the sides of the nut 34 to hold it against rotation with the shaft 31. Thus, rotation of the shaft 31 will cause longitudinal movement of the nut 34 and the limits of this movement are determined by lugs 35 on the shaft 31 which are engaged by projections 36 on the nut 34 upon predetermined travel of the nut.

The other end of the shaft 31 is journalled in a bearing member 37 which is secured to the head or flange 22 by suitable screws or bolts 38 and a flange 39 on the shaft 31 engages in a recess 40 in the bearing 37 to prevent longitudinal movement of the shaft 31. The shaft 31 may be rotated by knobs 41 and 42 secured on its ends by screws or bolts 43 and 44, respectively. The knob 41 is keyed to the shaft 31 by a screw 45 which extends into a key slot 46 in the shaft 31. This knob 41 has a skirt 47 upon which are index marks, not shown, to cooperate with index marks, not shown, on the flange 48 of the bearing member 37. These two sets of index marks cooperate to indicate the extent of movement of the fine adjustment as is known in the art.

The rear wall of the tubular arm 13 above the bushing 19 has a projection 49 for receiving one end of a shaft 50. The other end of this shaft is held in a bushing 51 which is secured in a hole 52 in the arm 13 by a set screw 53. This set screw preferably goes through the bushing 51 and engages the shaft 50 although the shaft 50 may, of course, be free to turn.

A plate 54 is journalled on the shaft 50 and has a depending leg 55, the end 56 of which is formed to bear against a projection 57 on the nut 34 so that movement of the nut 34 will cause rocking movement of the plate 54 on the shaft 51. A conical depression 58 is formed at the rear end of the plate 54 out of alignment with the shaft 50. The bearing point 59 of a rigid link 60 rests in this depression 58 so that the plate 54 and leg 55 form a bell crank lever for transmitting motion from the nut 34 to the link 60.

This rigid link 60 is so shaped that it can be dropped into the hollow arm 13 through the opening 61 at the top of the arm. Such a shape permits the arm 13 to be cast or otherwise formed as a single, unitary tube and hence makes the arm quite strong and rigid against forces which would otherwise cause the arm to bend or twist.

A screw 62 extends through the rear wall of the arm 13 and engages in a groove 63 in the link 60 to hold the link 60 against turning and to prevent the link 60 from rubbing against the sides of the arm 13.

A block 64 is slidably mounted on the arm 13 over the opening 61 and carries a projection 65 which extends into the hollow of the arm 13. A pin 66 fixed to the projection 65 rests on top of the link 60 and a suitable coil spring 67 urges the projection 65 toward the link 60. The motion of the link 60 is thus directly transmitted to the block 64.

A microscope body tube 68 carrying an objective 69 and eyepiece 70 is slidably mounted on the block 64 and may be moved relative to the block by a rack and pinion mechanism, not shown, under the control of the coarse adjustment knob 71 as is well known in the art.

One of the chief features of our improved microscope is the fact that it is simple to assemble and yet dust-proof and strong after assembly is complete. The lower end of the arm 13 is provided with an opening 72 through which the plate 54 and leg 55 can be inserted and this opening, together with the hole 52 are completely closed and made dust-tight by the stage 73 or substage assembly, not shown, which may be secured on the arm 13 directly over these apertures.

The fine adjustment screw 33, nut 34 and bushing 19 may be completed as a sub-assembly before insertion in the openings 14, 15 and 18. After insertion, the bushing 19 is locked relative to the arm 13 by a screw 74 which extends through the arm 13 and engages in a hole 75 in the bushing 19. In this way, the bushing 19 is made to turn with the arm so that there is no disturbance of the fine adjustment setting when the arm 13 is pivoted relative to the base 10.

From the foregoing, it will be apparent that we are able to attain the objects of our invention and provide a microscope having a low position fine adjustment and a hollow tubular arm through which the movement is transmitted to the body tube. Various modifications of structure can, of course, be made without departing from the spirit of our invention or the scope of the appended claims:

We claim:

1. In a microscope, a base, a one-piece, curved, tubular arm carried by said base and extending upwardly and forwardly therefrom, a microscope fine adjustment mechanism within and extending across said arm adjacent said base, a shaft fixed within said arm above and perpendicular to said mechanism, a bracket pivotally mounted on said shaft and extending from the front to the rear within said arm, a depending leg on the front end of said bracket operatively engaging said mechanism for actuation thereby, said bracket having a depression in its top surface adjacent its rear end and out of alignment with said shaft, a curved, rigid link extending upward within said tubular arm, a pivot point on the lower end of said link engaging in said depression, said link having a depression at its upper end, a microscope body tube assembly vertically slidably mounted at the upper end of said arm, a projection on said assembly projecting into said tubular arm, and a downwardly extending pin on said projection engaging in the depression on said link.

2. In a microscope the combination of a base, a one-piece tubular arm mounted on said base and extending in a curve rearwardly and upwardly and then forwardly therefrom, the upper end of said arm lying in a substantially vertical plane and being provided with an enlarged opening, a block providing a lens tube holder slidably mounted on the upper end of said arm, said block having a projection forming a support member, a link positioned without said arm, a second support member movably mounted within said arm, said support members and link being provided with cooperating depressions and pivot pins supporting said link between pivot points at its upper and lower ends, and a fine adjustment mechanism having a rotatable shaft extending through said arm near the bottom thereof for moving said second mentioned support member, said link being curved so that it is freely passable through said opening.

3. In a microscope the combination of a base, a one piece tubular arm mounted on said base and extending in a curve rearwardly and upwardly and then forwardly therefrom, the upper end of said arm lying in a substantially vertical plane and being provided with an enlarged opening, a block providing a lens tube holder slidably mounted on the upper end of said arm, said block having a projection forming a support member, a link positioned within said arm, a second support member movably mounted within said arm, said support members and link being provided with cooperating depressions and pivot pins supporting said link between pivot points at its upper and lower ends, a fine adjustment mechanism having a rotatable shaft extending through said arm near the bottom thereof for moving said second mentioned support member, and means extending through the wall of said arm and engaging said link for maintaining the link out of contact with the interior of the arm and in fixed position relative to rotational movement upon its pivots, said link being so curved that it is freely passable through said opening.

GEORGE B. GALLASCH.
HENRY F. KURTZ.
CARL H. O. WITTIG.